United States Patent

Lynch et al.

[11] Patent Number: 6,100,353
[45] Date of Patent: *Aug. 8, 2000

[54] SUPPORTED METALLOCENE CATALYST SYSTEMS

[75] Inventors: John Lynch, Monsheim; David Fischer, Gönnheim; Franz Langhauser, Bad Dürkheim; Hans-Helmut Görtz, Freinsheim; Jürgen Kerth, Carlsberg; Günther Schweier, Friedelsheim, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/523,888

[22] Filed: Sep. 6, 1995

[51] Int. Cl.$^7$ ...................................................... C08F 4/42
[52] U.S. Cl. ........................... 526/160; 526/348; 526/351; 526/352; 526/348.2; 526/348.4; 526/348.6; 526/124.5; 526/943; 502/109; 502/123; 502/129; 502/132; 502/169; 502/202
[58] Field of Search .................................... 502/104, 123, 502/124, 132, 164, 202, 103, 117, 133; 526/348, 351, 352, 348.6, 348.4, 348.2, 160, 124.5, 943

[56] References Cited

U.S. PATENT DOCUMENTS

| 5,036,034 | 7/1991 | Ewen | 502/103 |
|---|---|---|---|
| 5,064,802 | 11/1991 | Stevens et al. | 502/103 |
| 5,227,440 | 7/1993 | Canich et al. | 502/103 |
| 5,340,892 | 8/1994 | Kuramoto | 526/119 |
| 5,470,993 | 11/1995 | Devore et al. | 556/11 |
| 5,500,398 | 3/1996 | Marks et al. | 502/117 |
| 5,502,017 | 3/1996 | Marks et al. | 502/117 |
| 5,561,092 | 10/1996 | Ewen et al. | 502/104 |
| 5,612,271 | 3/1997 | Zandona | 502/104 |
| 5,670,587 | 9/1997 | Takeuchi et al. | 502/133 |
| 5,703,181 | 12/1997 | Tashiro et al. | 502/123 |
| 5,747,614 | 5/1998 | Takeuchi et al. | 502/123 |
| 5,756,607 | 5/1998 | Lux et al. | 502/117 |
| 5,763,349 | 6/1998 | Zandona | 502/104 |
| 5,786,433 | 7/1998 | Tomotsu et al. | 502/124 |
| 5,817,590 | 10/1998 | Hasegawa et al. | 502/124 |
| 5,834,393 | 11/1998 | Jacobsen et al. | 502/133 |

FOREIGN PATENT DOCUMENTS

| 2066247 | 1/1992 | Canada . |
|---|---|---|
| 0 426 637 | 5/1991 | European Pat. Off. . |
| 0 427 697 | 5/1991 | European Pat. Off. . |
| 0 573 120 | 12/1993 | European Pat. Off. . |
| WO 91/09882 | 7/1991 | WIPO . |
| WO 93/08199 | 4/1993 | WIPO . |
| 94/03506 | 2/1994 | WIPO . |
| 94/07928 | 4/1994 | WIPO . |

OTHER PUBLICATIONS

T.J. Marks et al., J.Am.Chem.Soc., vol. 113, pp. 3623–3625, 1991.

Chien et al., *Makromol. Chem. Rapid. Commun.*, vol. 14, No. 2, Feb. 1993, pp. 109–114.

*Primary Examiner*—Elizabeth D Wood
*Assistant Examiner*—Ling Siu Choi
*Attorney, Agent, or Firm*—Keil & Weinkauf

[57] ABSTRACT

Supported catalyst systems are obtainable by a) application of a mixture of
   A) at least one metallocene complex and
   B) at elast one metal compound
   to a carrier which, if required, may have been pretreated, and
b) subsequent activation by reaction with a solution or suspension of a compound forming metallocenium ions.

9 Claims, No Drawings

SUPPORTED METALLOCENE CATALYST SYSTEMS

The present invention relates to supported catalyst systems obtainable by a) application of a mixture of
A) at least one metallocene complex of the formula I

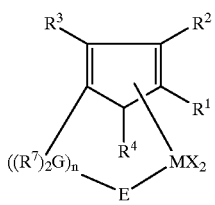

where
M is titanium, zirconium, hafnium, vanadium, niobium or tantalum,
X is fluorine, chlorine, bromine, iodine, hydrogen, $C_1$–$C_{10}$-alkyl, $C_6$–$C_{15}$-aryl or —$OR^5$,
$R^5$ is $C_1$–$C_{10}$-alkyl, $C_6$–$C_{15}$-aryl, alkylaryl, arylalkyl, fluoroalkyl or fluoroaryl, where each alkyl radical is of 1 to 10 carbon atoms and each aryl radical is of 6 to 20 carbon atoms,
$R^1$ to $R^4$ are each hydrogen, $C_1$–$C_{10}$-alkyl, 5-membered to 7-membered cycloalkyl which in turn may carry a $C_1$–$C_{10}$-alkyl as a substituent, $C_6$–$C_{15}$-aryl or arylalkyl, where two neighboring radicals together may furthermore form a cyclic group of 4 to 15 carbon atoms, or $Si(R^6)_3$,
$R^6$ is $C_1$–$C_{10}$-alkyl, $C_6$–$C_{15}$-aryl or $C_3$–$C_{10}$-cycloalkyl,
G is silicon, germanium, tin or carbon,
$R^7$ is hydrogen, $C_1$–$C_{10}$-alkyl, $C_3$–$C_{10}$-cycloalkyl or $C_6$–$C_{15}$-aryl,
n is 1, 2, 3 or 4,
E is —O—, —S—, <$NR^8$ or <$PR^8$,
$R^8$ is $C_1$–$C_{10}$-alkyl, $C_3$–$C_{10}$-cycloalkyl, $C_6$–$C_{15}$-aryl, alkylaryl or $Si(R^9)_3$ and
$R^9$ is $C_1$–$C_{10}$-alkyl, $C_8$–$C_{10}$-cycloalkyl, $C_6$–$C_{15}$-aryl, or alkylaryl, and
B) at least one metal compound of the formula II $$M^1(R^{10})_m(X^1)_o \qquad \text{II}$$

where
$M^1$ is an alkali metal or alkaline earth metal or a metal of main group III of the Periodic Table,
$R^{10}$ is hydrogen, $C_1$–$C_{10}$-alkyl, $C_6$–$C_{15}$-aryl, alkylaryl or arylalkyl, where each alkyl radical is of 1 to 10 carbon atoms and each aryl radical is of 6 to 20 carbon atoms,
$X^1$ is fluorine, chlorine, bromine or iodine,
m is an integer from 1 to 3, and
o is an integer from 0 to 2, the sum m+o corresponding to the valency of $M^1$,
to a carrier which, if required, may have been pretreated with at least one metal compound of the formula III $$M^2(R^{11})_p(X^2)_q \qquad \text{III}$$

where
$M^2$ is an alkali metal or alkaline earth metal or a metal of main group III of the Periodic Table,
$R^{11}$ is hydrogen, $C_1$–$C_{10}$-alkyl, $C_6$–$C_{15}$-aryl, alkylaryl or arylalkyl, where each alkyl radical is of 1 to 10 carbon atoms and each aryl radical is of 6 to 20 carbon atoms,
$X^2$ is fluorine, chlorine, bromine or iodine,
p is an integer from 1 to 3,
and
q is an integer from 0 to 2, where the sum p+q corresponds to the valency of $M^2$, and
b) subsequent activation by reaction with a solution or suspension of a compound forming metallocenium ions.

The present invention furthermore relates to processes for the preparation of such supported catalyst systems, their use for the preparation of polyolefins and processes for the preparation of polyolefins with the aid of these supported catalyst systems.

In recent years, homogeneous metallocene catalysts have made it possible to obtain well defined poly-1-olefins having a narrow molecular weight distribution and high chemical uniformity. In many cases, however, industrial use requires these catalysts to be converted into heterogeneous form, ensuring simple handling of the catalyst and effective control of the product morphology. Supported metallocene catalysts are known per se. For example, U.S. Pat. No. 5,227,440 describes systems in which $SiO_2$ is reacted with an alumoxane to give an alumoxane-laden carrier.

The metallocene is applied to this carrier, an active catalyst being formed.

WO 94/03506 discloses the preparation of a supported, cationic metallocene catalyst by application of the reaction mixture of a dialkyl metallocene with an ionic compound which has a Brönsted acid as the cation and a non-coordinating opposite ion, such as tetrakis (pentafluorophenyl)borate as the anion to an inorganic carrier. Here too, an active catalyst is obtained.

Similarly, WO 94/07928 describes the preparation of an active, supported catalyst by application of a dialkyl mono-cyclopentadienyltitanium complex to an alumoxane-pretreated carrier and activation by means of tris (pentafluorophenyl)borane.

Such catalysts which are already active readily give rise to problems in the metering of the catalyst into the reactor.

An even more inactive catalyst which can be activated only at a later stage, for example during metering or in the reactor itself, is therefore advantageous.

It is an object of the present invention to provide supported catalyst systems which do not have the stated disadvantages and in particular can be activated at any stage, the process used not being restricted to readily soluble metallocenes. It is furthermore intended to fix the metallocene used to a large extent on the carrier.

We have found that this object is achieved by the supported catalyst systems defined at the outset.

We have also found processes for the preparation of such supported catalyst systems, their use for the preparation of polyolefins and processes for the preparation of polyolefins with the aid of these supported catalyst systems.

The novel supported catalyst systems are obtainable by applying a mixture of a metallocene complex of the formula I and a metal compound of the formula II to a carrier in a first stage a).

Preferably used carriers are finely divided solids whose particle diameters are from 1 to 200 μm, in particular from 30 to 70 μm. Both inorganic and organic carriers may be used, the inorganic ones being preferred.

Suitable carriers are, for example, silica gels, preferably those of the formula $SiO_2 \cdot a\, Al_2O_3$, where a is from 0 to 2, preferably from 0 to 0.5; these are therefore aluminosilicates or silica. Such products are commercially available, for example Silica Gel 332 from Grace.

Other inorganic compounds, such as $Al_2O_3$ or $MgCl_2$, or mixtures containing these compounds may likewise be used as carriers.

Particular examples of organic carriers are finely divided polyolefins, such as polypropylene and polyethylene.

The carriers can be used directly or they may be pretreated with at least one metal compound of the formula III.

Preferred metal compounds of the formula III $$M^2(R^{11})_p(X^2)_q \qquad \text{III}$$

are those in which $M^2$ is Li, Na, K, Mg or Al, $R^{11}$ is $C_1$–$C_6$-alkyl, in particular $C_1$–$C_4$-alkyl, and $X^2$ is chlorine.

Particularly preferred metal compounds III are those in which q is zero, in particular magnesium alkyls and aluminum alkyls, such as $(n\text{-butyl})_2Mg$ and $(isobutyl)_3Al$. If a plurality of radicals $R^{10}$ or $X^2$ are present in a compound, they may in each case also be different.

The metal compound of the formula III is preferably added as a solution to a suspension of the carrier. Particularly suitable solvents and suspending media are hydrocarbons, such as heptane. The amount of metal compound III can be varied within wide limits, from 0 to 75% by weight per g of carrier being particularly suitable. The temperatures, reaction times and pressures are not critical per se, from 0 to 80° C., from 0.1 to 48 hours and from 0.5 to 2.0 bar being preferred.

It has proven useful to remove the excess metal compound III, after the pretreatment of the carrier, by washing out, for example with hydrocarbons, such as pentane or hexane, and to dry the carrier.

The mixture of metallocene complex I and metal compound II is then applied to the carrier which may or may not have been pre-treated.

Preferred metallocene complexes of the formula I are those in which

M is titanium, zirconium or hafnium,

X is chlorine, $R^1$ to $R^4$ are each hydrogen or $C_1$–$C_4$-alkyl or two neighboring radicals $R^2$ and $R^3$ together form a cyclic group of 4 to 12 carbon atoms, G is silicon or carbon and E is $>NR^8$.

In a metallocene complex, the radicals X may also be different, but are preferably identical.

The preparation of the metallocene complex I is described, for example, in WO 93/08199.

Preferred metal compounds II $$M^1(R^{10})_m(X^1)_o \qquad \text{II}$$

are those in which $M^1$ is Li, Mg or Al, $R^{10}$ is $C_1$–$C_6$-alkyl, in particular $C_1$–$C_4$-alkyl, and $X^1$ is chlorine.

Particularly preferred metal compounds II are those in which o is zero, in particular magnesium alkyls and aluminum alkyls, such as $(n\text{-butyl})_2Mg$ and $(isobutyl)_3Al$. If a plurality of radicals $R^{10}$ and $X^1$ are present in a compound, they may in each case also be different.

If the carriers have been pretreated, the metal compounds II may differ from the metal compounds III but are preferably identical to them.

The mixture of metallocene complex I and metal compound II is preferably applied to the carrier by a method in which the metallocene complex I is dissolved or suspended in an inert solvent, preferably in an aromatic hydrocarbon, such as toluene, and is reacted with the metal compound II, which is preferably likewise dissolved, for example in heptane, and the carrier is then added.

The molar ratio of metallocene complex I to metal compound II is from 100:1 to $10^{-4}$:1, preferably from 1:1 to $10^{-2}$:1. The ratio of carrier to metallocene complex I is preferably from 10 g:1 μmol to $10^{-2}$ g:1 μmol.

Neither the addition of the metal compound II to the metallocene complex I nor the addition of the carrier is critical per se, the procedure preferably being carried out at from 0 to 60° C. over a period of from 0.1 to 6 hours at from 0.5 to 2.0 bar.

After the application of the mixture of metallocene complex I and metal compound II to the carrier, the solvent is generally removed and the solid dried, said solid as such having no significant polymerization activity. This solid can then be activated in a further stage b) at any desired time by reaction with a solution or suspension of a compound forming metallocenium ions.

Particularly suitable compounds forming metallocenium ions are strong, neutral Lewis acids, ionic compounds having Lewis acid cations and ionic compounds having Bronsted acids as cations.

Preferred strong, neutral Lewis acids are compounds of the formula IV $$M^3X^3X^4X^5 \qquad \text{IV}$$

where $M^3$ is an element of main group III of the Periodic Table, in particular B, Al or Ga, preferably B, and $X^3$, $X^4$ and $X^5$ are each hydrogen, $C_1$–$C_{10}$-alkyl, $C_6$–$C_{15}$-aryl, alkylaryl, arylalkyl, haloalkyl or haloaryl, where each alkyl radical is of 1 to 10 carbon atoms and each aryl radical is of 6 to 20 carbon atoms, or fluorine, chlorine, bromine or iodine, in particular haloaryl, preferably pentafluorophenyl.

Particularly preferred compounds of the general formula IV are those in which $X^3$, $X^4$ and $X^5$ are identical, tris(pentafluorophenyl)borane being preferred.

Suitable ionic compounds having Lewis acid cations are compounds of the formula V $$[(A^{a+})Q_1Q_2\ldots Q_z]^{d+} \qquad \text{V}$$

where

A is an element of main groups I to VI or of subgroups I to VIII of the Periodic Table, $Q_1$ to $Q_z$ are each a radical having a single negative charge, such as $C_1$–$C_{28}$-alkyl, $C_6$–$C_{15}$-aryl, alkylaryl, arylalkyl, haloalkyl or haloaryl, where each aryl radical is of 6 to 20 carbon atoms and each alkyl radical is of 1 to 28 carbon atoms, $C_1$–$C_{10}$-cycloalkyl, which may be substituted by $C_1$–$C_{10}$-alkyl, or halogen, $C_1$–$C_{28}$-alkoxy, $C_6$–$C_{15}$-aryloxy, silyl or mercapto, a is an integer from 1 to 6, z is an integer from 0 to 5 and d is the difference a–z, but d is greater than or equal to 1.

Carbonium cations, oxonium cations and sulfonium cations as well as cationic transition metal complexes are particularly suitable. Particular examples are the triphenylmethyl cation, the silver cation and the 1,1'-dimethylferrocenyl cation.

They preferably have non-coordinating opposite ions, in particular boron compounds, as also mentioned in WO 91/09882, preferably tetrakis(pentafluorophenyl)borate.

Ionic compounds having Bronsted acids as cations and preferably likewise non-coordinating opposite ions are mentioned in WO 91/09882, a preferred cation being N,N-dimethylanilinium.

Since the activation can be carried out at any time, ie. before, during or after the metering of the supported catalyst system into the reactor, the activation conditions depend on this time but are not critical per se. The amount of compounds forming metallocenium ions is preferably from 0.1 to 100 equivalents, based on the metallocene complex I.

With the aid of these novel supported catalyst systems, it is possible to prepare polyolefins, in particular polymers of alk-1-enes. These include homo- and copolymers of $C_2$–$C_{10}$-alk-1-enes, preferably used monomers being ethylene, propylene, but-1-ene, pent-1-ene and hex-1-ene.

However, cycloolefins or higher alk-l-enes and alkenes generally can also be used as monomers for the homo- and copolymerization.

The preparation of the polymers can be carried out either batch-wise or, preferably, continuously in the conventional reactors used for the polymerization of alkenes. Suitable reactors include continuously operated loop reactors or stirred kettles, and a plurality of stirred kettles connected in series or high-pressure autoclaves or high-pressure tube reactors may also be used.

The polymerization conditions are not critical per se, pressures of from 0.5 to 3500, preferably from 10 to 50, bar and temperatures of from –60 to +200° C. having proven suitable. Polymerization reactions with the aid of the novel catalyst systems can be carried out in the gas phase, in a suspension and in inert solvents. Suitable suspending media or solvents are hydrocarbons, preferably $C_4$–$C_{10}$-alkanes.

The average molecular weight of the polymers formed can be controlled by the methods conventionally used in polymerization technology, for example by adding regulators, such as hydrogen, or by changing the reaction temperatures. Polymers having higher average molecular weights can be prepared by reducing the reaction temperatures.

The novel supported catalyst systems are distinguished by the fact that they can be activated at any desired time, that the metallocene used is to a large extent fixed on the carrier and that the preparation process is not restricted to readily soluble metallocenes.

EXAMPLES

Example 1

Application of a mixture of dimethylsilanediyl(N-tert-butyl-amido) ($\eta^5$-2,3,4,5-tetramethylcyclopentadienyl) titanium dichloride (Ia) and (isobutyl)$_3$Al to a pretreated inorganic carrier Example 1.1

Pretreatment of the carrier 20 g of $SiO_2$ (SG332 from Grace; mean diameter: 50 μm; dried for 12 h at 100° C. under reduced pressure) were suspended in 200 ml of dry heptane. 56 mmol of (isobutyl)$_3$Al (as a 2-molar solution in heptane) were added dropwise in the course of 30 minutes at room temperature, the temperature increasing to 45–50° C. Stirring was then continued over night, and the solid was filtered off and washed twice with 30 ml of hexane and twice with 30 ml of pentane. Finally, drying was carried out under reduced pressure from an oil pump until the weight remained constant.

Example 1.2

Application of the mixture of metallocene I and metal compound II

141 μmol (50 mg) of Ia

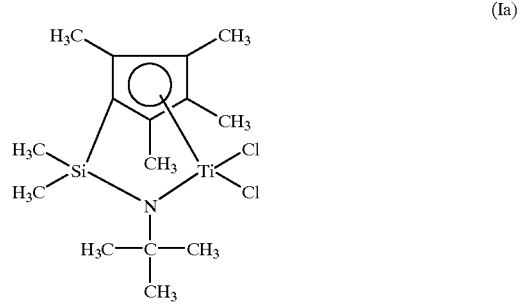

(Ia)

were suspended in 50 ml of absolute toluene. After the addition of 5 mmol of (isobutyl)$_3$Al (2-molar solution in heptane), the solution obtained was stirred for 10 minutes. Thereafter, 5 g of the carrier prepared under 1.1 were slowly added and the suspension obtained was stirred for a further 60 minutes. The solvent was then stripped off under reduced pressure and the solid residue was dried under reduced pressure from an oil pump until a free-flowing powder remained.

Example 2

Preparation of polyethylene (PE) in suspension with tris(pentafluorophenyl)borane as the compound forming metallocenium ions 350 mg of the supported catalyst prepared in Example 1 were suspended in 1000 ml of absolute toluene to which 2 mmol of (isobutyl)$_3$Al (as a 2-molar solution in heptane) had been added. The suspension was heated to 70° C. while passing in ethene (1 bar), and 12.5 mg (0.025 mmol) of tris(pentafluorophenyl)borane, dissolved in 5 ml of absolute toluene, were slowly added. After the addition of only 1 ml, substantial ethene uptake was observed. The polymerization was terminated after 60 minutes because the batch was no longer stirrable. Working up gave 10 g of PE with [η]=6.5 dl/g (measured according to DIN 53 728, Part 4).

Comparative Examples 1 and 2

Comparative Example 1

3.7 mg (10.4 μmol) of Ia were dissolved in 1000 ml of absolute toluene. After the addition of 4 mmol of (isobutyl)$_3$Al (as a 2-molar solution in heptane), the solution was heated to 70° C. while passing in ethene (1 bar). A solution of 25 mg (49 μmol) of tris(pentafluorophenyl)borane, dissolved in 10 ml of absolute toluene, was then slowly added via a dropping funnel. After the addition of only 4 ml of this solution, substantial ethene uptake was observed, finally reaching about 6 l/h. After a polymerization time of 60 minutes, the batch was no longer stirrable and the experiment was terminated. Working up gave 10 g of PE with $[\eta]$=4.1 dl/g (measured according to DIN 53 728, Part 4).

Comparative Example 2

Comparative Example 1 was repeated, only 2 mmol of (isobutyl)$_3$Al being used instead of 4 mmol. No detectable reaction occurred here.

We claim:

1. A process for the preparation of polyolefins at from 0.5 to 3500 bar and from −60 to +200° C. in the presence of a catalyst system comprising a solid catalyst component obtained by application of a mixture of A) at least one metallocene complex of the formula I

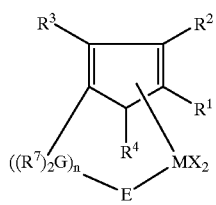

where
M is titanium, zirconium, hafnium, vanadium, niobium or tantalum,
x is fluorine, chlorine, bromine, iodine, hydrogen, $C_1-C_{10}$ alkyl, $C_6-C_{15}$ aryl or —$OR^5$,
$R^5$ is $C_1-C_{10}$ alkyl, $C_6-C_{15}$ aryl, alkylaryl, arylalkyl, fluoroalkyl or fluoroaryl, where each alkyl radical of the alkylaryl or arylalkyl is of 1 to 10 carbon atoms and each aryl radical of the alkylaryl or arylalkyl is of 6 to 20 carbon atoms,
$R^1$ to $R^4$ are each hydrogen, $C_1-C_{10}$ alkyl, 5-membered to 7-membered cycloalkyl which in turn may carry a $C_1-C_{10}$ alkyl as a substituent, or two neighboring radicals together with the atoms to which they are attached form a cyclic group of 4 to 15 carbon atoms, or $Si(R^6)_3$,
$R^6$ is $C_1-C_{10}$ alkyl, $C_6-C_{15}$ aryl or $C_3-C_{10}$ cycloalkyl,
G is silicon, germanium, tin or carbon,
$R^7$ is hydrogen, $C_1-C_{10}$ alkyl, $C_3-C_{10}$ cycloalkyl or $C_6-C_{15}$ aryl,
n is 1, 2, 3 or 4,
E is —O—, —S—, >$NR^8$ or >$PR^8$,
$R^8$ is $C_1-C_{10}$ alkyl, $C_3-C_{10}$ cycloalkyl, $C_8-C_{15}$ aryl, alkylaryl or $Si(R^9)_3$ and
$R^9$ is $C_1-C_{10}$ alkyl, $C_6-C_{10}$ cycloalkyl, $C_6-C_{15}$ aryl, or alkylaryl,
and
B) at least one metal compound of the formula II $$M^1(R^{10})_m(X^1)_o \qquad \text{II}$$

where
$M^1$ is an alkali metal or alkaline earth metal or a metal of main group III of the Periodic Table,
$R^{10}$ is hydrogen, $C_1-C_{10}$ alkyl, $C_6-C_{15}$ aryl, alkylaryl or arylalkyl, where each alkyl radical of the alkylaryl or arylalkyl is of 1 to 10 carbon atoms and each aryl radical of the alkylaryl or arylalkyl is of 6 to 20 carbon atoms, $X^1$ is fluorine, chlorine, bromine or iodine,
m is an integer from 1 to 3,
and
o is an integer from 0 to 2, the sum m+o corresponding to the valency of $M^1$,
to a support which, optionally, is pretreated with at least one metal compound of the formula III $$M^2(R^{11})_p(X^2)_q \qquad \text{III}$$

where
$M^2$ is an alkali metal or alkaline earth metal or a metal of main group III of the Periodic Table,
$R^{11}$ is hydrogen, $C_1-C_{10}$ alkyl, $C_6-C_{15}$ aryl, alkylaryl or arylalkyl, where each alkyl radical of the alkylaryl or arylalkyl is of 1 to 10 carbon atoms and each aryl radical of the alkylaryl or arylalkyl is of 6 to 20 carbon atoms,
$X^2$ is fluorine, chlorine, bromine or iodine,
p is an integer from 1 to 3,
and
q is an integer from 0 to 2, where the sum p+q corresponds to the valency of $M^2$
and a compound causing the forming of metallocenium ions wherein the solid catalyst component is activated by reaction with a solution or suspension of the compound forming metallocenium ions in the presence of the monomers.

2. The process of claim 1, wherein the monomers are $C_2-C_{10}$-alk-1-enes.

3. The process of claim 1, wherein the activation of the solid catalyst component is carried out immediately before, during or after the metering of the solid catalyst component into the reactor.

4. The process of claim 1, wherein the support is a solid having a particle size of from 1 to 200 $\mu$m.

5. The process of claim 1, wherein $R^1$ to $R^4$ are each hydrogen, $C_1-C_4$-alkyl or two neighboring radicals $R^2$ and $R^3$ together with the atoms to which they are attached form a cyclic group of 4 to 12 carbon atoms.

6. The process of claim 1, wherein a Lewis acid is used as the compound causing the forming of the metallocenium ions.

7. The process of claim 6, wherein the Lewis acid is a compound of the formula IV $$M^3X^3X^4X^5 \qquad \text{IV}$$

where
$M^3$ is an element of main group III of the Periodic Table and $X^3$, $X^4$ and $X^5$ are each hydrogen, alkyl, aryl, alkylaryl, arylalkyl, haloalkyl or haloaryl, where each alkyl radical is of 1 to 10 carbon atoms and each aryl radical is of 6 to 20 carbon atoms, or fluorine, chlorine, bromine or iodine.

8. The process of claim 1, wherein an ionic compound having a Lewis acid cation is used as the compound causing the forming of metallocenium ions.

9. The process of claim 1, wherein an ionic compound having a Brönsted acid as a cation is used as the compound causing the forming of metallocenium ions.

* * * * *

UNITED STATES PATENT AND TRADEMARK OFFICE
CERTIFICATE OF CORRECTION

PATENT NO. : 6,100,353
DATED : August 8, 2000
INVENTOR(S) : Lynch et al.

It is certified that error appears in the above-identified patent and that said Letters Patent is hereby corrected as shown below:

Title page,
Insert the following priority information:

--[30] Foreign Application Priority Data
Sep. 7, 1994 [DE] Germany.......................P 44 31 838.3 --.

Column 7, claim 1,
Line 49, ">$NR^8$ or >$PR^8$," should be -- $NR^8$ or $PR^8$, --.
Line 50, "$C_8$-$C_{15}$-aryl," should be -- $C_6$-$C_{15}$-aryl, --.
Line 52, "$C_6$-$C_{10}$-cycloalkyl," should be -- $C_8$-$C_{10}$-cycloalkyl, --.

Signed and Sealed this

Twenty-fifth Day of December, 2001

*Attest:*

JAMES E. ROGAN
*Attesting Officer*     *Director of the United States Patent and Trademark Office*